Sept. 12, 1939.   H. J. STEGEMAN   2,172,992
CONDUIT FOR LAWN MOWER MOTORS
Filed Nov. 21, 1938   2 Sheets-Sheet 1
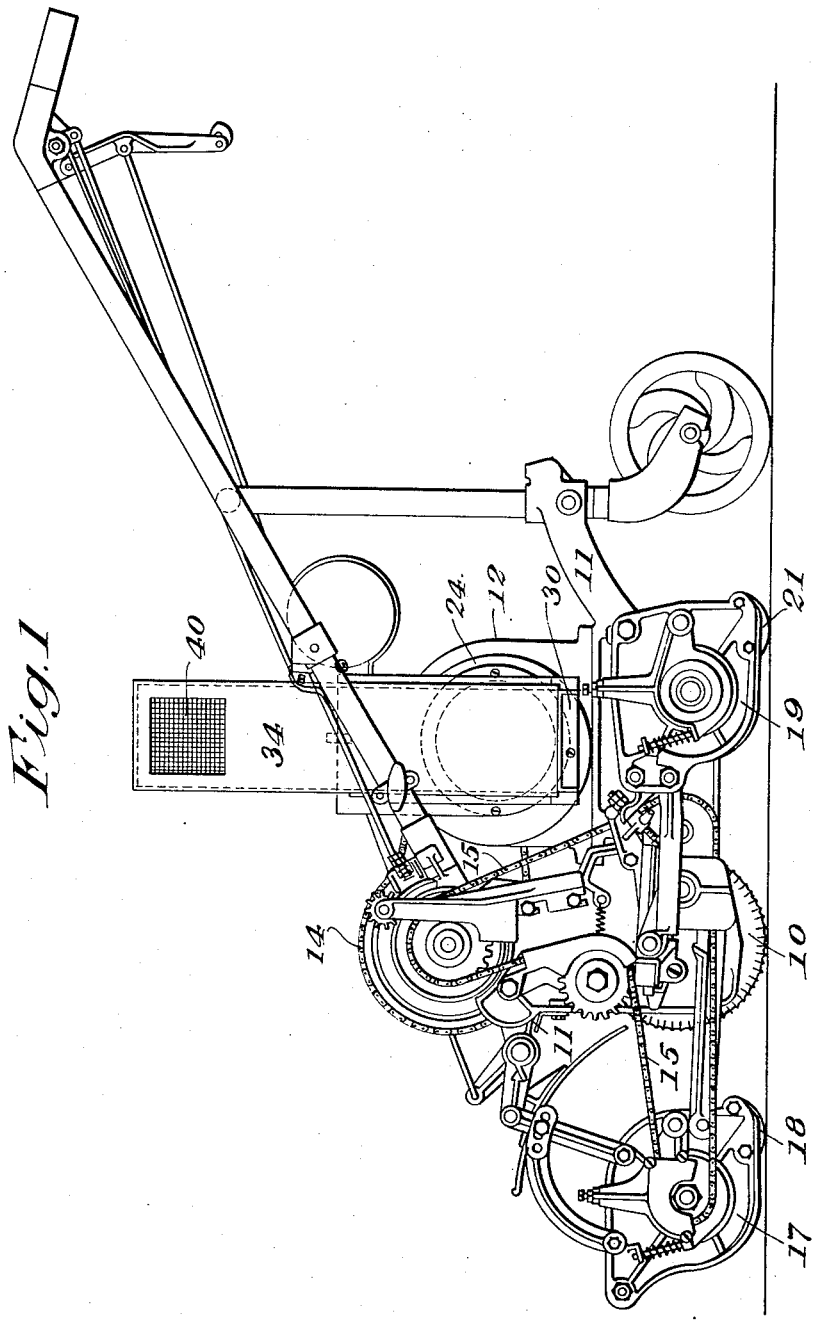
INVENTOR
Henry J. Stegeman
BY
C. M. Newman
ATTORNEY Sept. 12, 1939.  H. J. STEGEMAN  2,172,992
CONDUIT FOR LAWN MOWER MOTORS
Filed Nov. 21, 1938  2 Sheets-Sheet 2
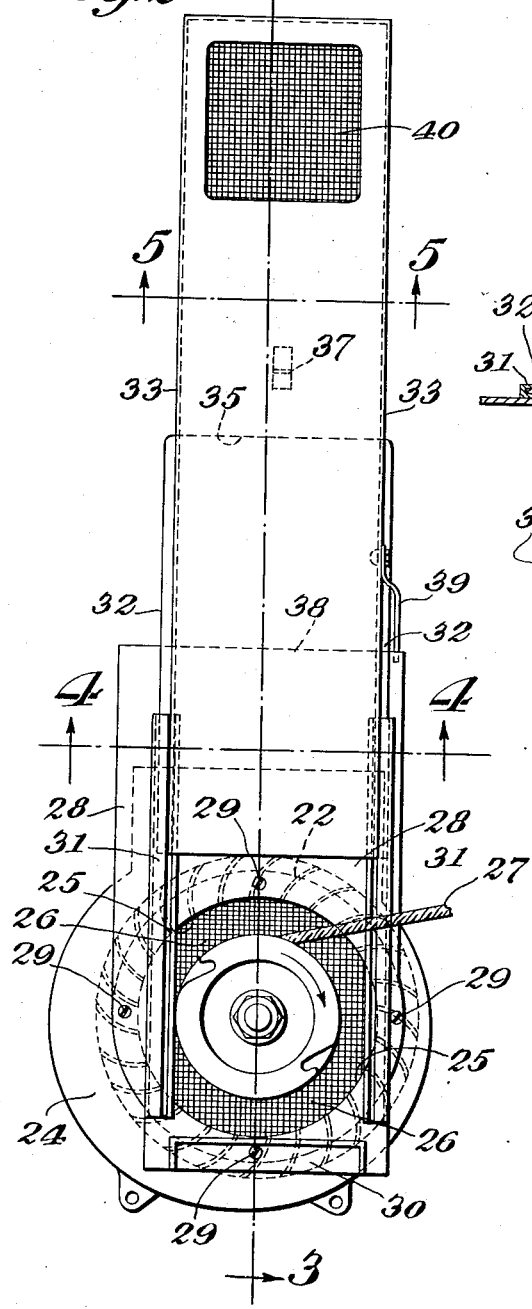
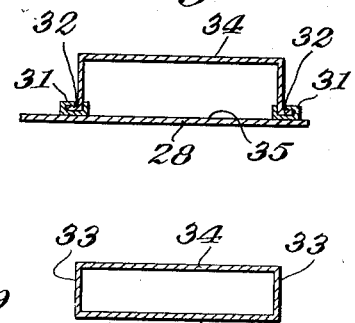
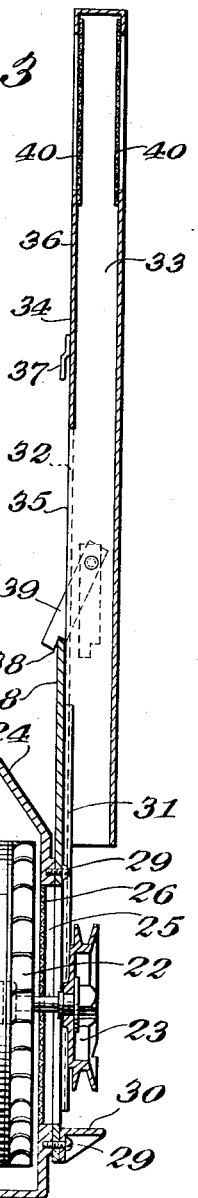
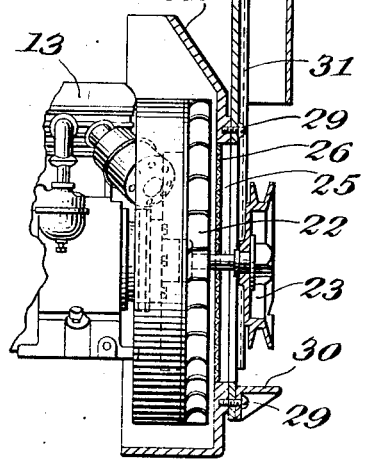
INVENTOR
Henry J. Stegeman
BY
C. M. Newman
ATTORNEY Patented Sept. 12, 1939

2,172,992

UNITED STATES PATENT OFFICE 2,172,992

CONDUIT FOR LAWN MOWER MOTORS

Henry J. Stegeman, Fairfield, Conn., assignor to The Locke Steel Chain Company, Bridgeport, Conn., a corporation of Connecticut Application November 21, 1938, Serial No. 241,573

3 Claims. (Cl. 123—195)

This invention relates to improvements in motor driven lawn mowers and can be used to advantage on most all classes of lawn mowers operated by gasoline motors, yet it is more helpful to those types of mowers having the motor positioned relatively low in the machine and in close proximity to the cutting reels.

Where the fan intake for air cooled gasoline motors is positioned relatively close to the ground and likewise near the cutting reels the flying grass from the reels is drawn against the screen of the intake and clogs the same, also, some grass is drawn through this screen and then adheres to the cooling fans of the motor so that the motor fails to be properly cooled thus resulting in unnecessary wear of the cylinders, pistons, rings and bearings.

Inasmuch as most all motor driven lawn mowers position their motor in more or less close proximity to the flying grass, considerable trouble is experienced, for the reason above suggested and therefore, as a power lawn mower designer I have provided an air duct which is attachable to the intake of the blower case of the motor and carry it upward out of reach of the flying lawn clippings in a manner to insure a free and ample supply of clean fresh air thus providing means for prolonging the life of the motor.

In addition to the attachment of a conduit to the cooling fan intake I provide a special form of conduit structure which enables it to be attached to the blower case of the motor in a way to normally cover the starting wheel for the motor, yet at the same time to provide means whereby the conduit can be opened to permit convenient access to the starter wheel, for the attachment of a pull rope whereby the wheel is turned and the rotor of the motor spun in order to create a spark and start the motor in operation, after which, the opening can be easily and tightly closed.

The invention is particularly desirable for that type of mower shown in Patent No. 1,944,584, which, as will be noted, includes an additional cutting unit on each side of the main unit and where the blower intake is in close proximity to the stream of the cut grass from the mower. This same type of intake for the air which cools the motor can also be used for water cooled engines.

Other features and advantages of the invention will be particularly noted from the following description of my improved form of conduit as applied to a power mower.

Referring to the drawings forming a part of this specification:

Fig. 1 shows a side view of a commercial motor driven mowing machine of the side unit type having my improved form of air conduit attached to the intake of the motor.

Fig. 2 shows an enlarged detached front elevation of the conduit, in an open position, with starting wheel and attached starting rope exposed.

Fig. 3 shows a central vertical section, taken on line 3—3 of Fig. 2, through the conduit in an open position and likewise briefly illustrating the starting pulley, the fan and part of the motor unit.

Fig. 4 is a cross section through the conduit taken on line 4—4 of Fig. 2, and

Fig. 5 shows a cross section somewhat like that shown in Fig. 4, except that it is taken higher up as on line 5—5 of Fig. 2.

Referring to the machine shown in Fig. 1, 10 represents ground engaging tractor wheels or rollers and 11 a frame which in part is supported by said rollers and 12 a motor case in which a motor is mounted to drive the machine through a sprocket chain 14 and from thence through other driving connections to the tractor rollers and cutting units. The chain 15 serves to drive the rotary elements in the cutting units 17—19. The cutting units are flexibly connected to the main frame and carried on ground engaging shoes 18 and 21 that for the most part move or slide along upon the grass.

The forward cutting unit of the machine is located directly in front of the ground engaging rollers, the motor before referred to being located central of the machine though immediately in the rear of the said ground engaging rollers. 19 represents one of two side cutter units which as will be seen are positioned to the rear of the ground engaging rollers and are hingedly connected to the main frame so as to permit the said units to be raised from the ground as may be desired. These side cutters are positioned on opposite sides of the machine in alignment with one another and in their operation of cutting the lawn slightly overlaps the cut of the forward cutting reel and thereby insures the cutting of a wide swarth. This rear cutting unit frame is also provided with a ground engaging shoe 21 and since these side cutters are hingedly attached to the main frame these shoes serve to follow the surface of the ground in a manner to movably support the cutting reels at a uniform distance from the ground.

It is more particularly the clippings from these side cutters, one of which is shown in Fig. 1, which heretofore has thrown the grass upward in front of the blower intake and cause the clogging of the same and injury to the motor.

Referring now to Figs. 1, 2 and 3 of the drawings where the motor, its fan wheel and rope pulley are illustrated in part or whole it will be seen that the fan 22 and the rope pulley 23, which in a sense are part of the motor unit, is covered with a housing 24, that also comprises a part of the machine illustrated in Fig. 1. The said housing, as shown in Figs. 2 and 3 being provided with a relatively large opening 25 which serves as an intake for air drawn in by the fan wheel for cooling the motor.

Since my invention has to do more particularly with a screened air duct for the motor I will refrain from further description of the particular mowing machine illustrated, since as before stated the same is more fully illustrated in an earlier patent, and besides because the invention is also applicable to other types of mowers.

As will be seen the starting wheel 23 to which a starting rope 27 is connected for spinning the wheel and its shaft, is normally positioned central of the housing 24. I have therefore constructed my attachable conduit to normally cover this wheel along with the opening 25 in the blower case 24.

This conduit, as will be seen, comprises two telescopically connected principal members, one of which consists of a plate 28 that is made attachable to the face of the housing by means of screws 29 and extends up slightly above the top of the housing. To the lower portion of this plate 28 is attached a shelf-like bracket 30 that extends across the face of the lower portion and serves as a means for closing the bottom end of the movable member of the conduit when the same is closed, which is the operating position of the conduit. The outer face of the plate 28 is also provided with a pair of guide ways 31—31, see Figs. 2, 3 and 4 to receive the bent out edge portions 32—32 of the side walls 33 of the movable member 34 of the conduit. The rear side of this movable member is cut away as at 35 which permits it to slide down unobstructed over the starting wheel 23, the said space being covered by the plate 28 when the movable member of the conduit is in a lower position.

The back 36 of the movable member 30 of the conduit is provided with a suitable stop 37 to engage the top edge 38 of the plate 28 when member 34 is closed since, as will be noted from the drawings, the lower end of this conduit slides down over the edge of the shelf. In this connection it will also be seen that I attach a turn-button 39 to the side of the extendable member 34 of the conduit which may be turned, in position to rest on the top of the housing so as to hold the said sliding member up out of the way when it is desired to spin the starting wheel 23. Screened openings 40 are provided on opposite sides of the upper end of this slidable member to allow fresh air to freely enter when the conduit is down in a closed or normal position, as shown in Fig. 1. The length of the conduit in practice is proportionately the same as that shown in the drawings, and extends up above the areas of the flow of grass clippings and is not in the way, for the convenient operation of the machine and thus provides a very desirable and practical improvement for power lawn mowers which as before suggested is, with very slight modifications, applicable to gasoline motors when mounted upon various types of commercial power lawn mowers.

As will be observed I preferably provide two screened openings, one on each side of the upper end portion of the slidable member of the conduit so that in case grass clippings should be carried by the wind against one screen the other side would still remain unobstructed.

Having thus described my invention what I claim and desire to secure by Letters Patent is:

1. The combination with a gasoline motor provided with a starting pulley and air intake, a casing covering the pulley and having an air intake provided with guide ways, a movable conduit section slidably mounted in said guide ways adapted to cover and uncover the pulley and having an outer and distantly located open end portion to admit fresh air to the motor, means for supporting the movable conduit section in an open position, and means for supporting said movable section in a closed position.

2. The combination with a gasoline motor provided with an air intake and starting pulley, of a casing covering the pulley and intake, a conduit formed of two members movably connected together, one of said members being secured on said casing surrounding the pulley and air intake, and the other member being mounted on the first mentioned member, and having an open end remote from the air intake and adapted to be moved with respect to the fixed member to open and close the conduit in a way to expose or cover the starting pulley to permit the latter to be operated.

3. The combination of a gasoline motor, including a casing, air intake and starting pulley, a two-part conduit covering the air intake and pulley, one member of said conduit being secured to the motor surrounding the air intake and the other member movably mounted on the first mentioned member and adapted to be adjusted to form an opening to expose the starting pulley, the said movable member having an air intake opening in its end portion farthest from the starting pulley, and means for supporting the movable member in an open position.

HENRY J. STEGEMAN.